(12) United States Patent
Brisebois et al.

(10) Patent No.: US 9,049,731 B2
(45) Date of Patent: Jun. 2, 2015

(54) FACILITATION OF BANDWIDTH-BASED FEMTO CELL MANAGEMENT

(71) Applicant: AT&T Mobility II LLC, Atlanta, GA (US)

(72) Inventors: Arthur Richard Brisebois, Cumming, GA (US); David Beppler, Duluth, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 249 days.

(21) Appl. No.: 13/692,429

(22) Filed: Dec. 3, 2012

(65) Prior Publication Data

US 2014/0153497 A1    Jun. 5, 2014

(51) Int. Cl.
*H04W 4/00*      (2009.01)
*H04W 72/08*     (2009.01)

(52) U.S. Cl.
CPC .................................. *H04W 72/085* (2013.01)

(58) Field of Classification Search
USPC ........................................................ 370/329
See application file for complete search history.

(56) References Cited

U.S. PATENT DOCUMENTS

| | | | |
|---|---|---|---|
| 7,315,573 B2 | 1/2008 | Lusky et al. | |
| 7,590,423 B2 | 9/2009 | Park et al. | |
| 7,769,074 B2 * | 8/2010 | Nakache et al. | 375/132 |
| 2005/0153702 A1 * | 7/2005 | Cuffaro et al. | 455/452.1 |
| 2005/0286547 A1 * | 12/2005 | Baum et al. | 370/437 |
| 2006/0218264 A1 * | 9/2006 | Ogawa et al. | 709/223 |
| 2007/0121737 A1 * | 5/2007 | Yoshii et al. | 375/260 |
| 2007/0263702 A1 | 11/2007 | Kwon et al. | |
| 2010/0177670 A1 | 7/2010 | Hottinen | |
| 2010/0311452 A1 | 12/2010 | Li et al. | |
| 2011/0319071 A1 | 12/2011 | Beppler et al. | |
| 2012/0114050 A1 * | 5/2012 | Osterling | 375/259 |
| 2013/0028228 A1 * | 1/2013 | Nakayama et al. | 370/329 |
| 2013/0077576 A1 * | 3/2013 | Abe et al. | 370/329 |
| 2013/0114531 A1 * | 5/2013 | Ahn et al. | 370/329 |

* cited by examiner

*Primary Examiner* — Kenny Lin
(74) *Attorney, Agent, or Firm* — Amin, Turocy & Watson, LLP

(57) ABSTRACT

A femto cell access point device (FAPD) selects channel bandwidth and frequency for transmission based on bandwidth of a broadband channel between the femto cell and a core network. A method can include determining a data throughput associated with a broadband channel communicatively coupling the access point device and a network device of a network, and evaluating channel information associated with a plurality of frequency sub-bands. The access point device can be configurable to communicate over the plurality of frequency sub-bands. The method can also include selecting a transmission parameter for a mobile device, wherein the selecting is based on the data throughput, and wherein the transmission parameter comprises information representing a selected set of the plurality of frequency sub-bands. The broadband channel can be a digital subscriber line (DSL) channel in some embodiments.

20 Claims, 10 Drawing Sheets

FACILITATION OF BANDWIDTH-BASED
FEMTO CELL MANAGEMENT

TECHNICAL FIELD

The subject disclosure relates to wireless communications and, also generally, to various embodiments that facilitate bandwidth-based femto cell management.

BACKGROUND

With the proliferation of varied types of communications inside of the home, femto cells and corresponding femto cell access point devices (FAPDs) serve an increasingly important role with regard to quality of service and coverage for end users. Femto cells and corresponding FAPDs can also reduce backhaul traffic while reducing costs to operators.

DETAILED DESCRIPTION

Figure 1:
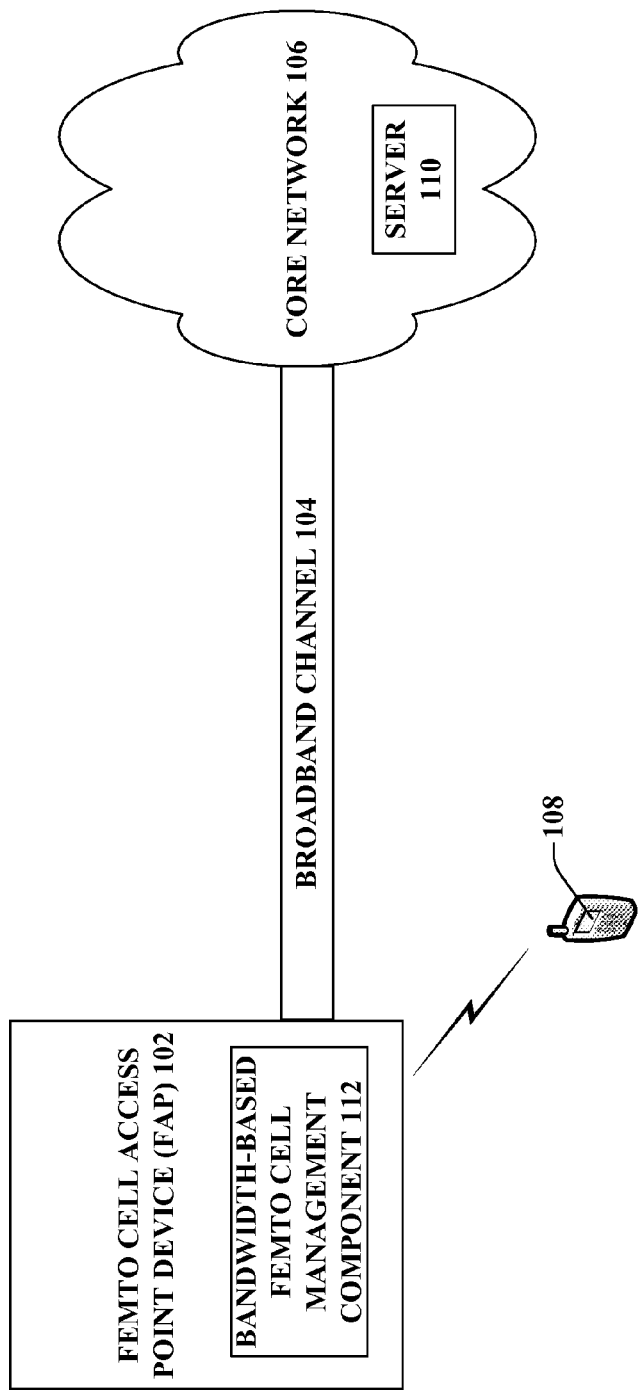
FIG. 1 illustrates an example block diagram of a system in which bandwidth-based femto cell management can be facilitated in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (femto cell device)," "Node B," "evolved Node B (eNode B),"

"home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "mobile device," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the term "femto" and "femto cell" are used interchangeably, and the terms "macro" and "macro cell" are used interchangeably.

Femto cells can occupy and share bandwidth with many other layers of the cellular network. For example, femto cells can occupy and share bandwidth with macro cells, pico cells and/or other femto cells. However, the various cells can interfere with one another. As the number of layers and femto cells increase, differentiation, identification, and/or coordination of cells and/or avoidance of interference between the different cells can worsen. This is especially problematic if the same channel is used in all layers of the cellular network serving common areas. In this case, the broadcast channels can overlap, which can cause idle mode decoding problems.

Additionally, the pool of available physical cell identifiers (PCIs) can be too small to enable differentiation in dense layered environments. This is especially problematic in LTE femto cell applications in which a closed subscriber group (CSG) is applied. In this case, mobile devices that are not included on the femto cell Access Control or white list can receive broadcast channel interference from a FAPD that does not allow camping. As a result, a very poor signal-to-interference noise ratio (SINR) for broadcast channel reception can result.

Standards such as the 3GPP release 8 LTE allow for use of sub-band channel quality indicator (CQI) feedback and frequency selective scheduling by a FAPD. These mechanisms can configure the mobile device and FAPD in a closed-loop interference avoidance mechanism for the shared channel physical resource block (PRB). Unfortunately, downlink (DL) sub-band CQI feedback and frequency selective scheduling can be signaling-intensive and provide limited gain in dense layered network scenarios because the overlapping femto cell and resulting interference layers can combine to create a relatively flat interference environment as detected by the mobile device and sub-band CQI reporting. In this case, interference avoidance can be nearly impossible. Also, sub-band CQI feedback and frequency selective scheduling typically pertain to active mode use of shared channel PRB and therefore may provide no relief for idle mode broadcast channel decoding problems.

Finally, current mechanisms may not adapt the bandwidth of LTE channels to suit the maximum throughput allowed by the transport pipe. For example, in the femto cell case, the mechanisms do not adapt the bandwidth of LTE channels to suit the maximum throughput capacity of a broadband channel (e.g., digital subscriber line (DSL) channel). An LTE femto cell may therefore occupy more radio or cellular resources than ideal for the broadband backhaul or transport channel.

In one or more embodiments, the systems and/or methods described herein can increase the likelihood of efficient use of LTE channels in dense femto cell environments. Better differentiation and reduced broadcast channel interference between channels in densely populated and covered network overlay areas can be achieved. Further, the systems and methods can be self-adjusting to allow automatic adaptation to rapidly changing technology and interference environments.

In one embodiment, a method can include determining, by an access point device including a processor, a data throughput associated with a broadband channel communicatively coupling the access point device and a network device of a network, evaluating, by the access point device, channel information associated with a plurality of frequency sub-bands, wherein the access point device is configurable to communicate over the plurality of frequency sub-bands, and selecting, by the access point device, a transmission parameter for a mobile device, wherein the selecting is based on the backhaul data throughput capacity, and wherein the transmission parameter comprises information representing a selected one of the plurality of frequency sub-bands.

In one embodiment, a system can include a memory to store computer-executable instructions, and a processor, communicatively coupled to the memory, that facilitates execution of computer-executable instructions to perform operations. In some embodiments, the operations can include determining a data throughput between the system and a network device, evaluating a plurality of frequency sub-bands based on channel quality information for the plurality of frequency sub-bands, selecting a channel bandwidth of a plurality of channel bandwidths associated with a predicted throughput that satisfies a defined condition relative to the data throughput between the system and the network device, wherein the predicted throughput is a throughput of information through a frequency sub-band of the plurality of frequency sub-bands, and selecting a frequency sub-band of the plurality of frequency sub-bands for transmission, wherein the selecting is based on the evaluating and the selecting.

In one embodiment, a computer-readable storage medium is provided. The computer-readable storage medium stores computer-executable instructions that, in response to execution, cause a system including a processor to perform operations. In some embodiments, the operations include determining a data throughput between the system and a network device, ranking a plurality of frequency sub-bands based on channel quality information determined for the plurality of frequency sub-bands, selecting a channel bandwidth of a plurality of channel bandwidths associated with a predicted throughput that satisfies a defined condition relative to the data throughput, wherein the predicted throughput is a throughput of information through a frequency sub-band of the plurality of frequency sub-bands, and selecting a frequency sub-band of the plurality of frequency sub-bands, wherein the selecting the frequency sub-band is based on the evaluating.

FIG. 1 illustrates an example block diagram of a system 100 in which bandwidth-based femto cell management can be facilitated in accordance with embodiments described herein. The system 100 can include a FAPD 102 including a bandwidth-based femto cell management (BBFM) component 112, a broadband channel 104 and a core network connected to the FAPD 102 by the broadband channel 104. In some embodiments, the system 100 can also include a mobile device 108.

As shown, the FAPD 102 can be communicatively coupled to the core network 106 via the broadband channel 104. In some embodiments, the broadband channel 104 can be a digital subscriber line (DSL) channel. In other embodiments, any number of other channels that can facilitate broadband provisioning can be employed and include, but are not limited to, cable, fiber to the x (FTTx), or other consumer broadband for delivery of public internet service. Such service may be best-effort, or of variable bandwidth.

In some embodiments, the FAPD 102 can include the BBFM component 122. The BBFM component 112 can dynamically evaluate and/or select channel bandwidth and/or frequency for transmission, and can do so based on a number of factors. As described herein, the FAPD 102 can be an LTE femto cell or a femto cell configured for transmission and receipt of information in any of a number of other different types of networks including, but not limited to, WiMax, GSM, wideband code division multiple access (WCDMA) or the like.

To evaluate and/or select channel bandwidth and/or frequency for transmission, the FAPD 102 can evaluate the data throughput of the broadband channel 104 from time to time. The FAPD 102 can collaborate with the mobile device 102 to receive channel information (e.g., DL channel quality indicator information and UL noise information) for a number of frequency ranges on which transmission can occur. Based on the channel information, the FAPD 102 can rank the frequency ranges. The FAPD 102 can then compare the predicted throughput for different frequency ranges with the data throughput of the broadband channel 104. The FAPD 102 can select the minimum channel bandwidth corresponding to the predicted throughput that exceeds the broadband channel 104 data throughput. The corresponding frequency range can also be selected for transmission. As such, bandwidth-based approaches to management of the femto cell are provided.

The mobile device 108 of FIG. 1 can be a mobile device configured to communicate with the FAPD 102 in some embodiments. For example, the mobile device 108 can have an identifier included on the white list of the FAPD 102. The mobile device 108 can transmit information to and/or receive information from the FAPD 102. In various aspects, the information received at the mobile device 108 can originate at a device communicatively coupled to the core network 106 and/or to a femto cell (not shown) associated with the core network 106.

The mobile device 108 can be any number of different wireless mobile devices including, but not limited to, a cellular telephone, a tablet, a laptop, a personal digital assistant (PDA) or the like. In various scenarios, the mobile device 108 can transmit and/or receive information on one or more different channels (e.g., LTE channels) and/or one or more different frequency sub-bands. For example, the FAPD 102 can determine an optimal channel bandwidth and frequency sub-band for transmission by the mobile device 108 based on the data throughput of the broadband channel 104.

In some embodiments, the core network 106 can include a server 110 or any number of other devices that can receive a signal from the FAPD 102 and/or the mobile device 108 for purposes of FAPD 102 determination of data throughput over the broadband channel 104, network latency or the like.

Figure 2:
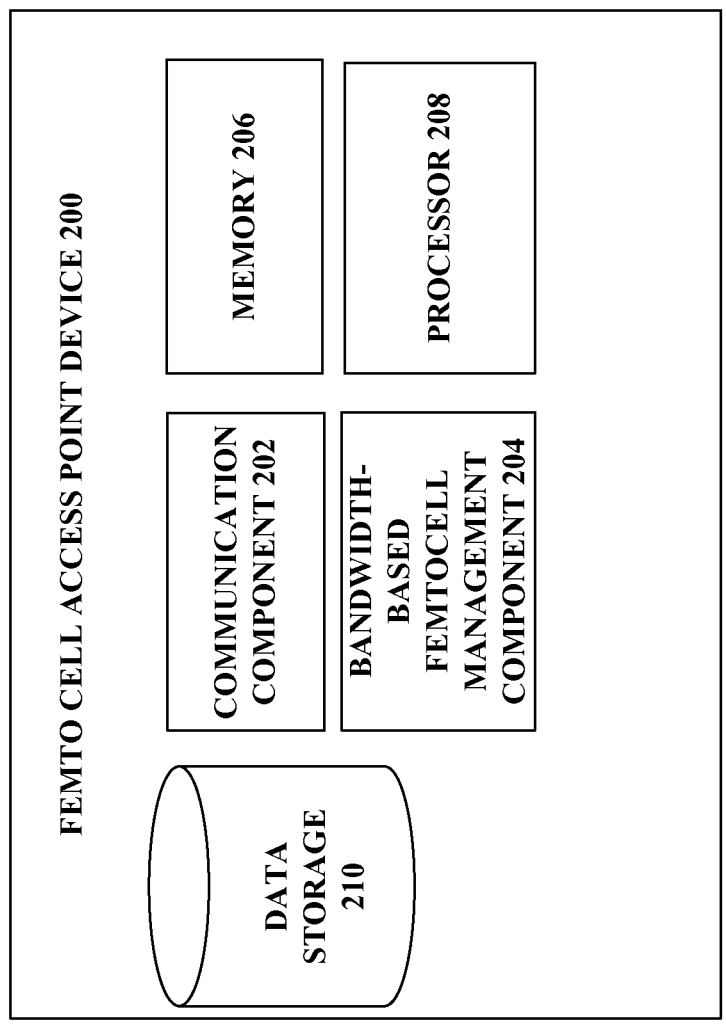
FIG. 2 illustrates an example system configured to facilitate bandwidth-based femto cell management in accordance with embodiments described herein.
Figure 3:
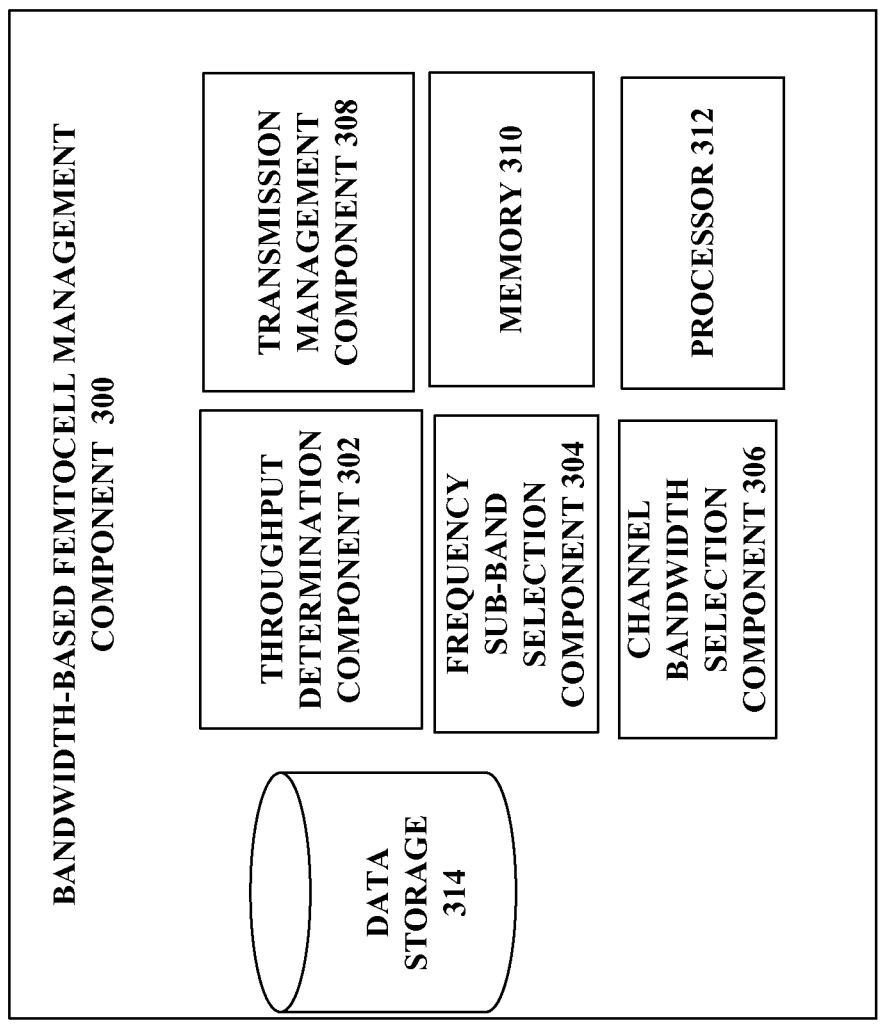
FIG. 3 illustrates an example block diagram of a bandwidth-based femto cell management component in accordance with embodiments described herein.
Figure 4:
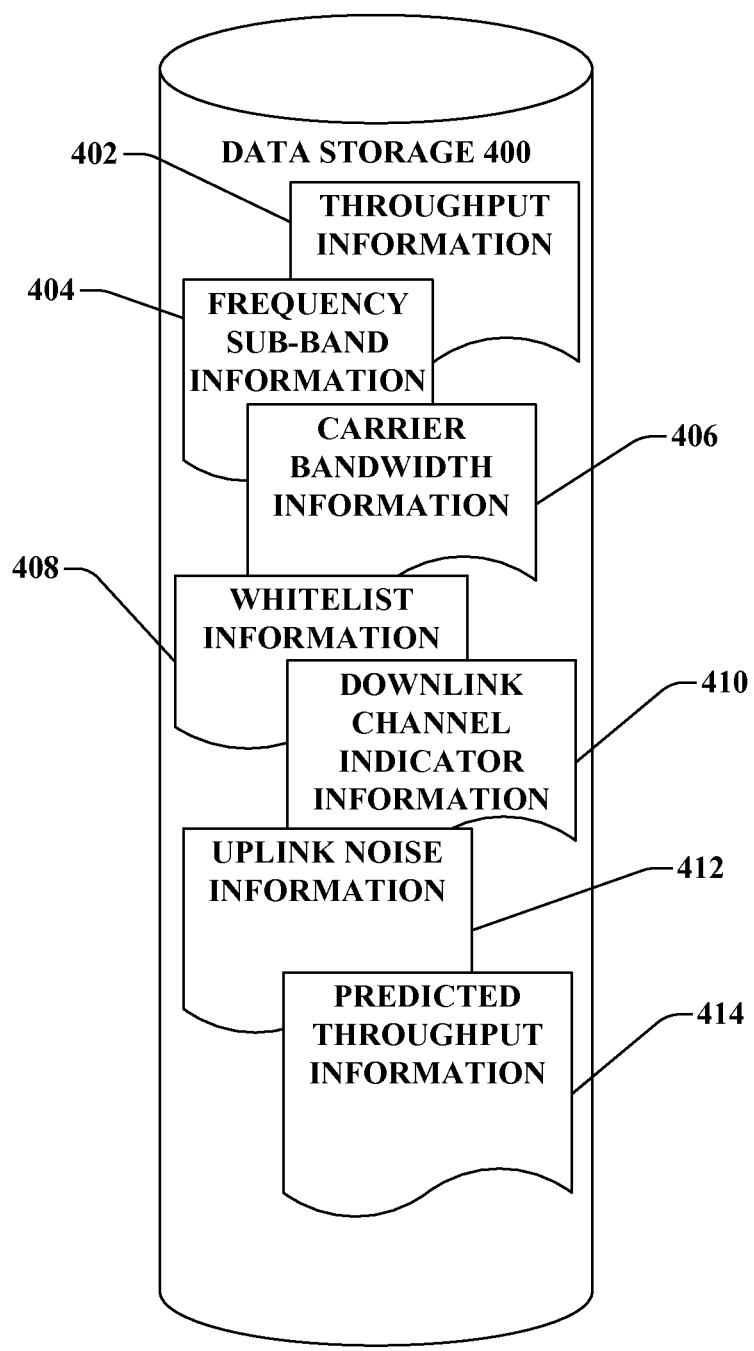
FIG. 4 illustrates an example diagram of a data storage that facilitates bandwidth-based femto cell management in accordance with embodiments described herein.
Figure 5:
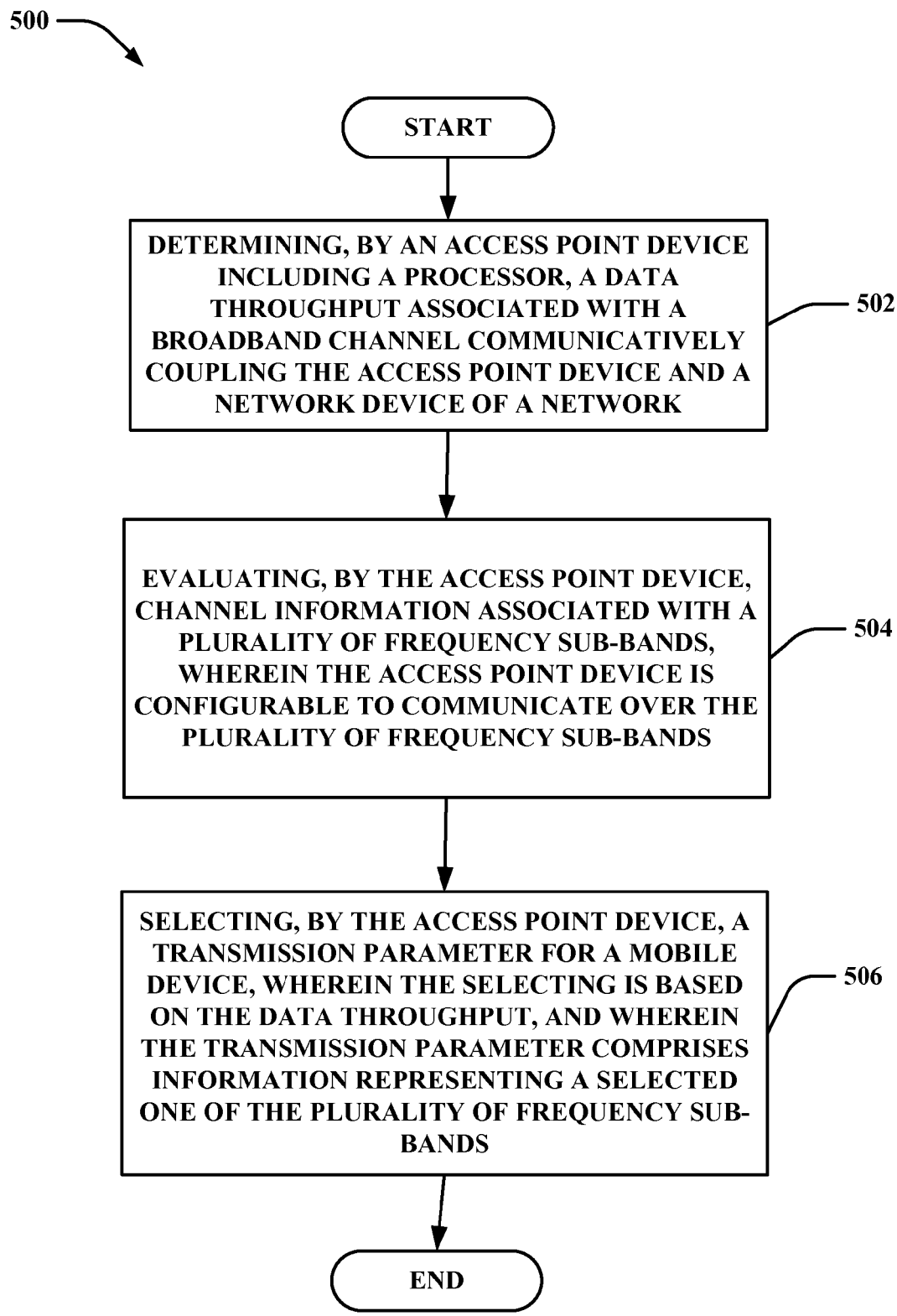
FIGS. 5-9 illustrate example flowcharts of methods that facilitate bandwidth-based femto cell management in accordance with embodiments described herein.

The FAPD 102 will be described in greater detail with reference to FIGS. 2, 3 and 4. FIG. 2 illustrates an example system configured to facilitate bandwidth-based femto cell management in accordance with embodiments described herein. FIG. 3 illustrates an example block diagram of a bandwidth-based femto cell management component in accordance with embodiments described herein. FIG. 4 illustrates an example diagram of a data storage that facilitates bandwidth-based femto cell management in accordance with embodiments described herein. One or more of the structure and/or functionality of FAPD 102 can be included in FAPD 200 (or vice versa).

Turning first to FIG. 2, the FAPD 200 can include a communication component 202, BBFM component 204, a memory 206, a processor 208 and/or data storage 210. In some embodiments, one or more of the communication component 202, bandwidth-based femto cell management (BBFM) component 204, memory 206, processor 208 and/or data storage 210 can be electrically and/or communicatively coupled to one another to perform one or more functions of the FAPD 102, 200.

The communication component 202 can transmit and/or receive information to and/or from the FAPD 102, 200. For example, in various embodiments, the communication component 202 can transmit and/or receive information to and/or from a mobile device (e.g., mobile device 108) having an identifier on the white list of the FAPD 102, 200. Identification information for mobile devices on the white list of the FAPD 102, 200 can be stored as white list information 408 in data storage 400. The data storage 400 can be stored at the FAPD 102 and/or merely accessible by the FAPD 102 (and stored at a location other than the FAPD 102).

As another example, the communication component 202 can transmit and/or receive information to and/or from one or more systems and/or channels located in a residential or commercial area served by the FAPD 102, 200. In various aspects, the information transmitted and/or received to and/or from the communication component 202 can be any number of different types of information including, but not limited to, call setup information, or voice, video and/or data information.

In some embodiments, the communication component 202 is configured to receive information such as channel information for a number of different frequency ranges on which the FAPD 200 can transmit and/or receive information. The channel information can be employed to enable the FAPD 200, in general, and the BBFM component 204, in particular, to determine an optimal channel bandwidth and/or frequency sub-band for transmission and/or receipt of information. As such, the communication component 202 can be configurable to transmit and/or receive information via different channels (e.g., different LTE channels) and/or different frequency ranges. Although the channel information is described above as channel information for different frequency ranges on which the FAPD 200 can transmit and/or receive information, in some aspects, the channel information can be for different frequency ranges on which a mobile device or any type of user equipment can transmit. In some embodiments, the communication component 202 can transmit a defined amount of information between the FAPD 200 and a device within the core network to which the FAPD 200 is coupled via a channel, such as a DSL channel.

The BBFM component 204 can be described in greater detail with reference to FIG. 3. As such, one or more of the structure and/or functionality of BBFM component 202 is included in the structure and/or functionality of the BBFM component 300. As shown in FIG. 3, the BBFM component 300 can include a throughput determination component 302, frequency sub-band selection component 304, channel bandwidth selection component 306, transmission management component 308, memory 310, processor 312 and/or data storage 314. One or more of the throughput determination component 302, frequency sub-band selection component 304, channel bandwidth selection component 306, transmission management component 308, memory 310, processor 312 and/or data storage 314 can be electrically and/or communicatively coupled to one another to perform one or more functions of the BBFM component 204, 300.

The throughput determination component 302 can evaluate the resources associated with the broadband channel to which the BBFM component 300 is communicatively coupled to determine optimal channel bandwidth and frequency range transmission parameters for the FAPD 200. For example, in some embodiments, the broadband capacity of the channel can be exhausted by a femto cell LTE channel having a bandwidth that is either 3 MHz wide or 1.4 MHz wide. Accordingly, the BBFM component 300 can identify the bandwidth of the broadband channel before selecting optimal channel bandwidth size for the femto cell LTE channel.

The broadband channel bandwidth can be evaluated based on a calculation of data throughput over the channel. Such a process, including standard files or data-generating processes and evaluation protocols or applications, can be part of the provisioning or auto-provisioning setup of the FAPD 200 in some embodiments and/or can be executed on a periodic basis. In some embodiments, calculation of the data throughput of the channel can be triggered based on system performance falling below defined limits.

In particular, in some embodiments, the throughput determination component 302 of the BBFM 300 can determine the data throughput (or, in some embodiments, the maximum data throughput) of the broadband channel. For example, the throughput determination component 302 can evaluate the bandwidth of the broadband channel based on the data throughput of the connection between the FAPD 102 and the core network 106. For example, at numerous times of day (or week or month), the data throughput over the broadband connection between the FAPD 102 and the core network 106 can be calculated.

For example, the throughput determination component 302 can determine the uplink (UL) broadband data throughput over the broadband channel 104 by determining the number of bytes of information transferred between the FAPD 102 and the server 110 divided by the time between the first and the last byte received at the server 110. The throughput determination component 302 can determine the DL broadband data throughput over the broadband channel 104 by determining the number of bytes of information transferred between the server 110 and the FAPD 102 divided by the time between the first and last byte received at the mobile device 108. In some embodiments, the data throughput can be stored as throughput information 402 in data storage 400.

In other embodiments, loop back measurements can be designed to test latency and other broadband channel parameters. For example, a ping signal can be transmitted from the throughput determination component 302 and/or a mobile device (e.g., mobile device 108). The throughput determination component 302 and/or mobile device can initiate a network response test by transmitting a ping signal to a device (e.g., ping client) in the core network.

Upon receiving the response from the device in the core network and/or the ping client, the BBFM can receive and/or compute measurements. For example, the BBFM can compute the Round Trip Time (RTT), jitter, packet loss, noise level, or other metrics determined by the service provider. In some embodiments, the mobile device can perform the computation and transmit the information computed to the throughput determination component 302. In various embodiments, the computed information can be compared to defined parameters (and corresponding parameter values).

Turning now to the frequency sub-band selection component 304, different candidate frequency sub-bands can be evaluated for ranking and eventual selection of an optimal frequency sub-band for transmission. The frequency sub-band selection component 304 can evaluate the interference of different frequency sub-bands to aid in selection of an optimal frequency sub-band to choose for transmission. In some embodiments, the frequency sub-bands can be LTE frequency sub-bands. In other embodiments, the frequency sub-bands of other different types of systems can be evaluated including, but not limited to, UMTS frequency sub-bands. In some embodiments, the frequency sub-bands can be 1 MHz segments of an LTE channel having a total channel bandwidth of 10 MHz, for example.

In various embodiments, the frequency sub-band selection component 304 can rank different candidate frequency sub-bands based on the noise and channel characteristics for the different frequency sub-bands. For example, in some embodiments, the frequency sub-band selection component 304 can collaborate with a mobile device to generate and/or receive channel information (e.g., downlink channel quality indicator information and/or uplink noise information) for the different frequency sub-bands. Although the channel information is described as downlink channel information, in one or more aspects the channel information can be uplink and/or downlink channel information.

In some embodiments, the frequency sub-band selection component 304 and a mobile device having an identifier on the white list of the BBFM component 300 can collaborate to identify the portions of a frequency range for best use within the service area of the FAPD 200. For example, the frequency sub-band selection component 304 can trigger sub-band channel quality indicator (CQI) reporting to obtain channel information for evaluation of the frequency sub-bands.

In particular, a white listed mobile device for the FAPD 102, 200 can report separate CQI information for each of a plurality of frequency sub-bands upon the mobile device initiation of a data call (e.g., streaming audio call or video call) in the area served by the FAPD 200. For example, a user of the mobile device can initiate a data call and release the call after walking a circuit around the home. During the duration of the call, the mobile device can transmit CQI information to the FAPD 200 for each of ten 1 MHz frequency sub-bands, and the frequency sub-band selection component 304 can record the CQI information for each frequency sub-band.

In some embodiments, in lieu of a call being placed by a user of the mobile device to trigger reporting by the mobile device and recording by the frequency sub-band selection component 304, the BBFM component 300 can perform a periodic test automatically and without human intervention. For example, CQI reporting can be performed at periodic intervals by the mobile device. For example, the CQI reporting can be performed every 1 millisecond (ms) to every 10 ms. The CQI reporting can be performed according to 3GPP standards well known to those skilled in the art including, but not limited to, those outlined in the 3GPP LTE release 8 and beyond standards.

In some embodiments, the frequency sub-band selection component 304 can generate a table of information including the DL CQI information (or average DL CQI information) for each frequency sub-band for which CQI information is received. For example, the table can include DL CQI information for each of the 1 MHz frequency sub-bands for which CQI information is reported by the mobile device.

In some embodiments, a distribution can be generated that characterizes the information obtained during CQI reporting. Numerous distributions can be evaluated and compared with one another to rank the different frequency sub-bands.

To retrieve UL noise information, the frequency sub-band selection component 304 can generate a signal that causes the communication component 202 to scan UL frequencies corresponding to the 1 MHz frequency sub-bands for which DL CQI information was recorded by the frequency sub-band selection component 304. Upon scanning the UL frequencies, the frequency sub-band selection component 304 can determine and calculate UL noise for each of the frequency sub-bands. The frequency sub-band selection component 304 can associate the UL noise (or, average UL noise) with the DL CQI table information for each frequency sub-band to form a channel quality table. Although described as UL noise, in various embodiments, UL noise can be substituted for average UL noise.

In various aspects, the frequency sub-band selection component 304 can store the information in any number of different formats allowing the frequency sub-band selection component 304 to access and/or determine the DL CQI and UL noise for each sub-band, and need not place the information in a table. For example, the DL CQI information and/or UL noise can be stored as DL channel indicator information 410 and UL noise information 412 of data storage 400.

Information identifying the different frequency ranges can be stored as frequency sub-band information 404. In various embodiments, the DL channel indicator information 410, UL noise information 412 and/or frequency sub-band information 404 can be stored in any number of different formats, including, but not limited to, a table.

The frequency sub-band selection component 304 can then rank one or more of the frequency sub-bands according to best DL CQI information and lowest UL noise. In some embodiments, the frequency sub-band selection component 304 can rank each of the frequency sub-bands to generate an ordered listing of the frequency sub-bands with the frequency sub-band having the optimal DL CQI and lowest UL noise being a top-ranked frequency sub-band and the frequency sub-bands decreasing in ranked order according to decreasing DL CQI and increasing UL noise.

In various embodiments, wireless communication systems can have channel bandwidths of different widths. For example, the LTE channels are 20, 15, 10, 5, 3 or 1.4 MHz wide. Predicted throughput can be dependent upon the particular channel bandwidth, downlink CQI information and UL noise information. For example, a narrow LTE channel with good downlink CQI and low UL noise is generally able to deliver better throughput than a wide LTE channel with poor downlink CQI and high uplink noise.

In particular, the throughput determination component 302 can predict throughputs for one or more of the frequency sub-bands. Each of the predicted throughputs can be an estimated throughput calculated based on an assumption that the respective DL CQI information and the UL noise information previously-recorded for the particular frequency sub-band exists. For example, for each 1 MHz portion of the channel bandwidth, the throughput determination component 302 can apply the downlink CQI and uplink noise information previously-recorded for the frequency sub-band corresponding to the 1 MHz portion in order to predict throughput over the frequency sub-band. The predicted throughput can be stored as the predicted throughput information 414 of data storage 400 in some embodiments.

Next, the channel bandwidth selection component 306 can determine an optimal channel bandwidth for transmission based on predicted throughputs generated for the frequency sub-bands. For example, predicted throughput for each 1 MHz portion can be compared to broadband data throughput.

If the predicted throughput of the top ranked 1 MHz portion, for example, is better than broadband data throughput, then a 1.4 MHz wide channel is selected for transmission by the channel bandwidth selection component 306. However, if the predicted throughput for the 1.4 MHz wide channel is not greater than the broadband channel data throughput, the throughput determination component 302 can calculate a combined predicted throughput of a number of the top ranked 1 MHz portions (i.e., 1 MHz wide frequency sub-bands). The ranking of the frequency sub-bands can be the ranking generated by the frequency selection component 302 in some embodiments. In one embodiment, the combined predicted throughput can be a total of the predicted throughputs of the top three ranked 1 MHz portions (i.e., the top three ranked frequency sub-bands).

The channel bandwidth selection component 306 can then compare the combined predicted throughput to the broadband channel throughput. If the combined predicted throughput is greater than the broadband channel data throughput, the channel bandwidth selection component 306 can select an LTE channel bandwidth that is 3 MHz wide.

In general, the channel bandwidth selection component 306 can select the minimum channel bandwidth for which the predicted throughput is greater than the data throughput of the broadband channel. The predicted throughputs for numerous frequency sub-bands can continue to be combined until the predicted throughput for the combined frequency sub-bands is greater than the data throughput of the broadband channel.

While the embodiments described herein refer to the data throughput of the broadband channel, in any of the embodiments, the maximum or average data throughput of the broadband channel can be employed. For example, the channel bandwidth selection component 306 can compare one or more of the predicted throughputs with the maximum data throughput of the broadband channel to determine whether a predicted throughput is greater than the maximum data throughput of the broadband channel, and select a channel bandwidth accordingly. In various embodiments, the channel bandwidth selection component 306 can compare the predicted throughput one by one based on the channel bandwidth associated with the predicted throughput to identify a minimum channel bandwidth that has an associated predicted throughput that is greater than the maximum broadband channel data throughput. The corresponding frequency sub-band(s) can also be selected for transmission.

Accordingly, in various embodiments, the channel bandwidth selection component 306 can identify the smallest contiguous channel bandwidth for which predicted throughput exceeds the broadband channel data throughput. Identification information for the different possible channel bandwidths can be stored as the channel bandwidth information 406 in some embodiments.

The transmission management component 308 can then cause the FAPD 200 to configure to transmit and/or receive information over the selected frequency sub-band(s) (e.g., LTE evolved universal terrestrial radio access (E-UTRA) absolute radio frequency channel number (EARFCN)) associated with the predicted throughputs that were greater than the data throughput of the broadband channel. Transmission management component 308 can also cause the FAPD 200 to configure to transmit and/or receive information over the selected channel bandwidth (e.g., 1.4 MHz, 3 MHz, 5 MHz, 10 MHz, 15 MHz or 20 MHz).

The selected frequency sub-band can be shared and/or aligned with the EARFCN in the idle mode re-selection lists of neighboring femto cells to support re-selection and handover to a new FAPD frequency. When a FAPD frequency is changed, the neighbor femto cell can update the neighbor femto cell list. Updating can be performed done via operational support systems (OSS) automation.

The interference environment affecting the FAPD 200 can change as new channels are added nearby. For this reason the FAPD 200 can repeat the processes described herein on a regular basis or when performance indicators (e.g., data throughput and dropped calls) fall below acceptable limits. The available broadband channel bandwidth/data throughput can also vary based on load or other conditions, and can also be repeated to assure optimal matching of bandwidth/data throughput.

With reference to FIGS. 2 and 3, the memory 206, 310 can be a computer-readable storage medium storing computer-executable instructions and/or information for performing the functions described herein with reference to the FAPD 102, 200 and/or the BBFM component 300. For example, the memory 206, 310 can store computer-executable instructions for calculation of data throughput of a broadband channel, calculation of predicted throughputs, ranking of frequency sub-bands, selection of a channel bandwidth and frequency sub-band for transmission and the like.

Processor 208, 312 can perform one or more of the functions described herein with reference to the FAPD 102, 200 and/or the BBFM component 300. For example, the processor 208, 312 can facilitate data throughput of a broadband channel, calculation of predicted throughputs, ranking of frequency sub-bands, selection of a channel bandwidth and frequency sub-band for transmission and the like.

The data storage 210, 314 can be configured to store information transmitted to, received by and/or processed by the FAPD 102, 200 and/or the BBFM component 300. In various embodiments, the data storage 210, 314 can store information including, but not limited to, the information stored in data storage 400, information for communication with the mobile devices on the white list of the FAPD or the like.

While the multiple memory 206, 310, processor 208, 312 and/or data storage 210, 314 are described above, in some embodiments, only one of memory 206, 310, processor 208, 312 and/or data storage 210, 314 are provided in the FAPD 102, 200.

Additionally, while the FAPD 102, 200 described herein is associated with the LTE system, in other embodiments, the FAPD 102, 200, and systems and methods of operation thereof can be associated with any number of other different technologies for which femto cells can be provided including, but not limited to, GSM, W-CDMA, CDMA2000 and WiMax.

FIGS. 5-9 illustrate example flowcharts of methods that facilitate bandwidth-based femto cell management in accordance with embodiments described herein. At 502, method 500 can include determining a data throughput associated with a broadband channel communicatively coupling the access point device and a network device of a network. For example, the maximum data throughput over the channel can be determined based on the time duration for transferring information between the access point device and a second device communicatively coupled to the network. For example, the amount of time necessary to transfer a defined quantity of data from the access point device to the second device can be determined to be the maximum data throughput in some embodiments.

In some embodiments, the access point device is a FAPD and the channel is a broadband channel. While method 500 describes steps for a FAPD and a broadband channel, a microcell or pico cell AP can be employed in lieu of a FAPD.

At 504, method 500 can include evaluating channel information associated with a plurality of frequency sub-bands, wherein the access point device is configurable to communicate over the plurality of frequency sub-bands, and wherein the channel information is associated with a channel. For example, each of the frequency sub-bands can be ranked based on DL CQI information and UL noise information for the frequency sub-band. In particular, the frequency sub-band having the best DL CQI and the lowest UL noise can be top-ranked and the frequency sub-bands can decrease in rank based on increasing UL noise and/or decreasing value of the DL CQI information.

At 506, method 500 can include selecting, by the access point device, a transmission parameter for a mobile device, wherein the selecting is based on the data throughput, and wherein the transmission parameter comprises information representing a selected one of the plurality of frequency sub-bands. In some embodiments, the transmission parameters selected by the access point device can include a frequency sub-band and a channel bandwidth over which a mobile device can transmit.

Figure 6:
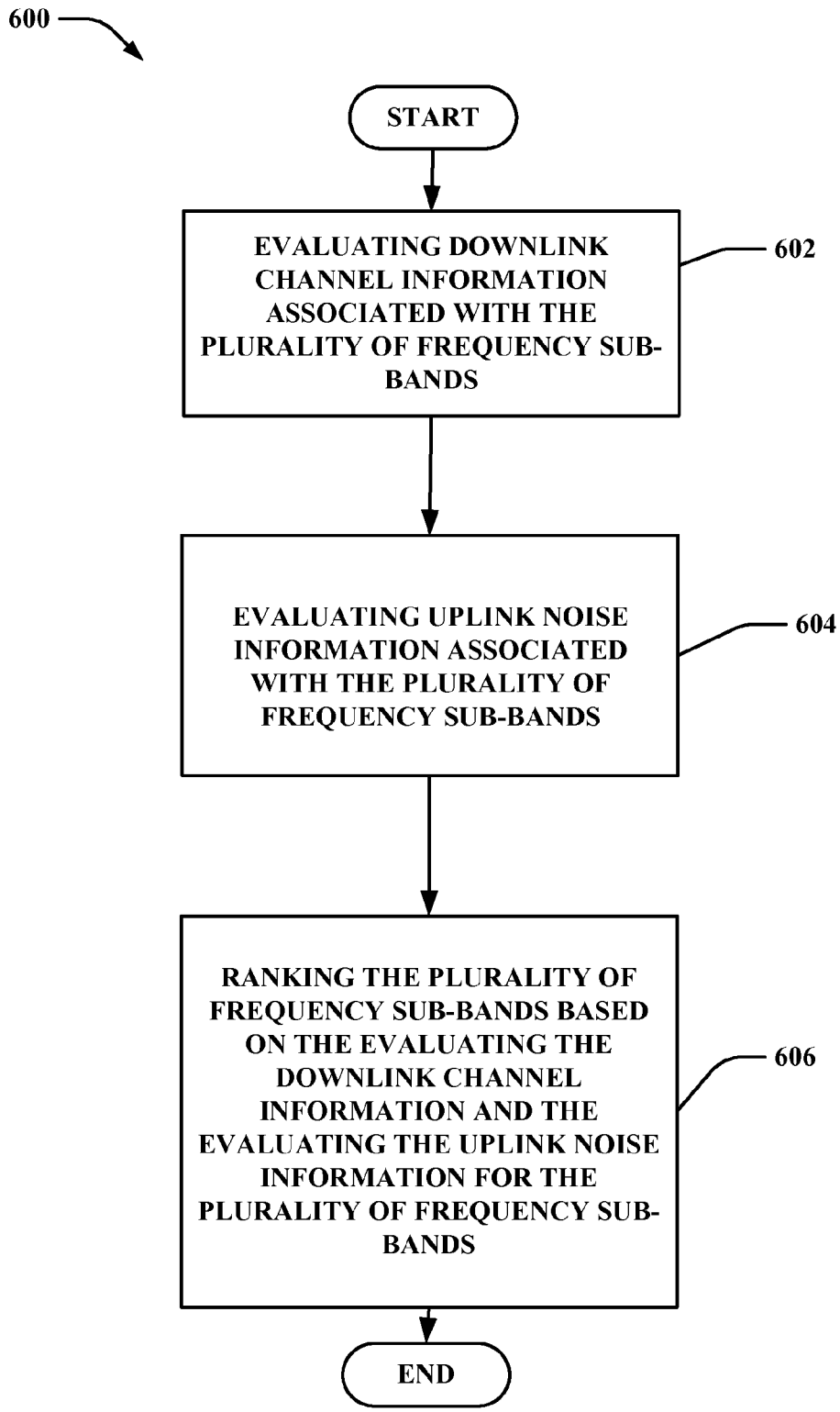

Turning now to FIG. 6, at 602, method 600 can include evaluating downlink channel information associated with the plurality of frequency sub-bands. In some embodiments, the downlink channel information includes information indicative of a downlink channel quality indicator for one or more (or all) of the frequency sub-bands.

At 604, method 600 can include evaluating uplink noise information associated with the plurality of frequency sub-bands. At 606, method 600 can include ranking the plurality of frequency sub-bands based on the evaluating the channel information and the evaluating the uplink noise information for the plurality of frequency sub-bands.

Figure 7:
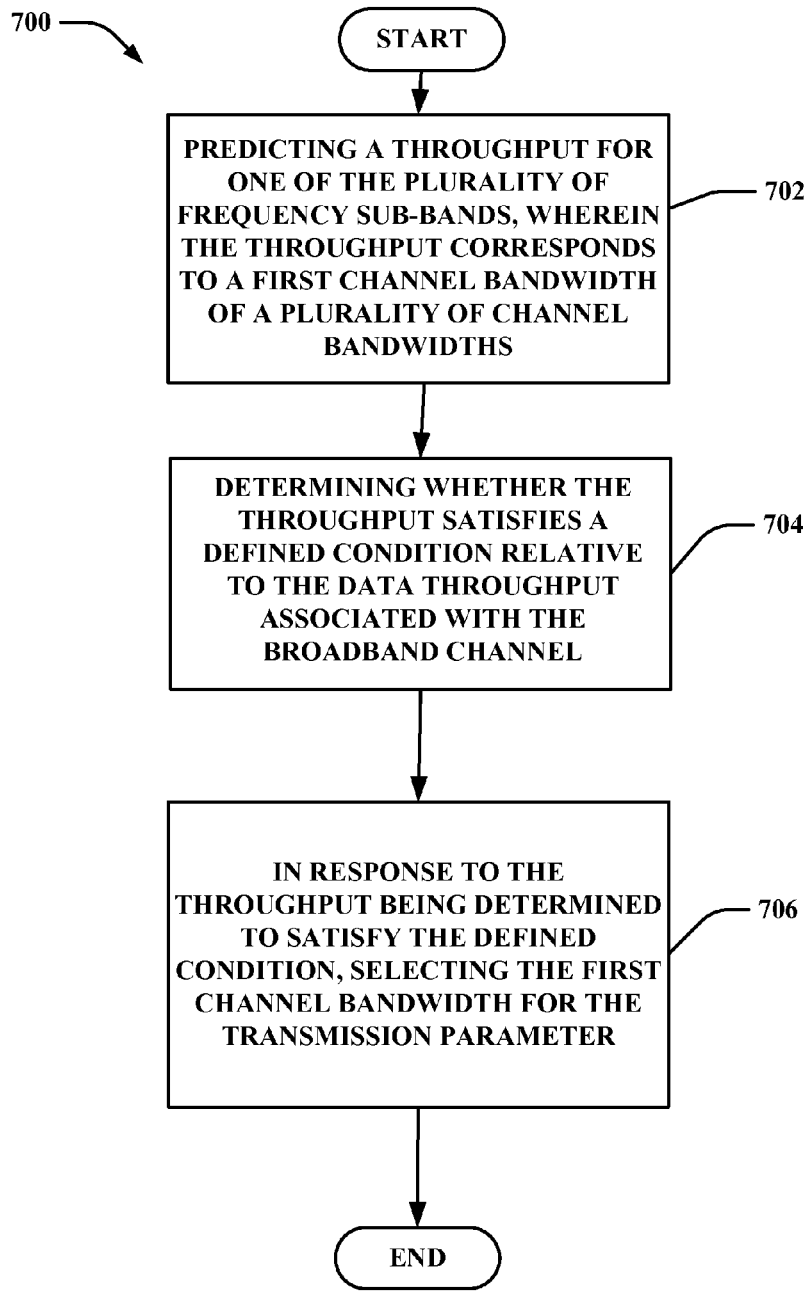

A method of selecting the channel bandwidth transmission parameter (as referenced in 506 of method 500) can be as described with reference to FIG. 7. Turning now to FIG. 7, at 702, method 700 can include predicting a throughput for one of the plurality of frequency sub-bands, wherein the throughput corresponds to a first channel bandwidth of a plurality of channel bandwidths. The predicted throughput can correspond to a channel bandwidth. The prediction can be based on the DL CQI information and the UL noise information for the frequency sub-band.

At 704, method 700 can include determining whether the throughput satisfies a defined condition relative to the data throughput associated with the broadband channel. For example, the defined condition can be the predicted throughput being greater than the data throughput of the broadband channel to which a FAPD is connected.

At 706, method 700 can include, in response to the throughput being determined to satisfy the defined condition, selecting the first channel bandwidth for the transmission parameter. In some embodiments, the selection of the channel bandwidth can include selecting a first one of the respective channel bandwidths based on determining that the one of the respective predicted throughputs corresponding to the first one of the respective channel bandwidths is greater than the data throughput over the channel between the access point device and the network. One of the frequency sub-bands for which the respective predicted throughput is greater than the data throughput over the channel between the access point device and the network can then be selected for transmission by the mobile device.

In general, in some embodiments, selection of the channel bandwidth includes selecting a minimum one of the respective channel bandwidths having an associated predicted throughput (or combined one or more predicted throughputs) that is greater than the data throughput over the broadband channel between the FAPD and the network.

In some embodiments, if the predicted throughput does not satisfy the defined condition (e.g., is not greater than the data throughput of the broadband channel to which the FAPD is connected), the predicted throughputs of numerous frequency sub-bands can be combined (in ranked order, combining the top three ranked frequency sub-bands first, for example) and the combined predicted throughput value can be compared to the data throughput of the broadband channel. If the combined predicted throughput value is greater than the data throughput of the broadband channel, the next widest system channel bandwidth (e.g., next widest LTE system channel bandwidth) can be selected. The method is described in greater detail with reference to FIG. 8.

Figure 8:
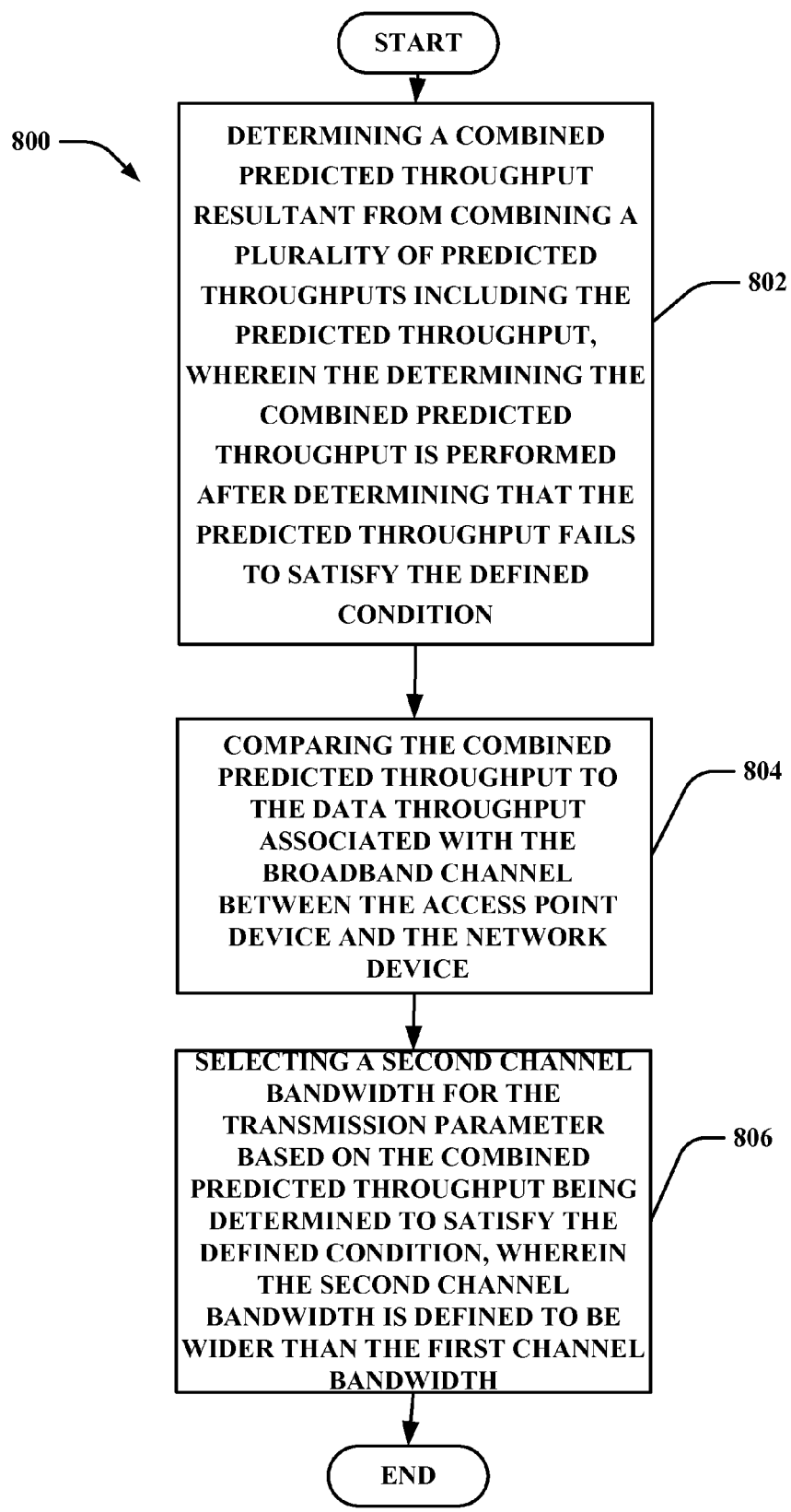

Turning now to FIG. 8, another method of determining the channel bandwidth is shown. At 802, method 800 can include determining a combined predicted throughput resultant from combining a plurality of predicted throughputs including the predicted throughput, wherein the determining the combined predicted throughput is performed after determining that the predicted throughput fails to satisfy the defined condition.

At 804, method 800 can include comparing the combined predicted throughput to the data throughput associated with the broadband channel between the access point device and the network device. At 806, method 800 can include selecting a second channel bandwidth for the transmission parameter based on the combined predicted throughput being determined to satisfy the defined condition, wherein the second channel bandwidth is defined to be wider than the first channel bandwidth.

Figure 9:
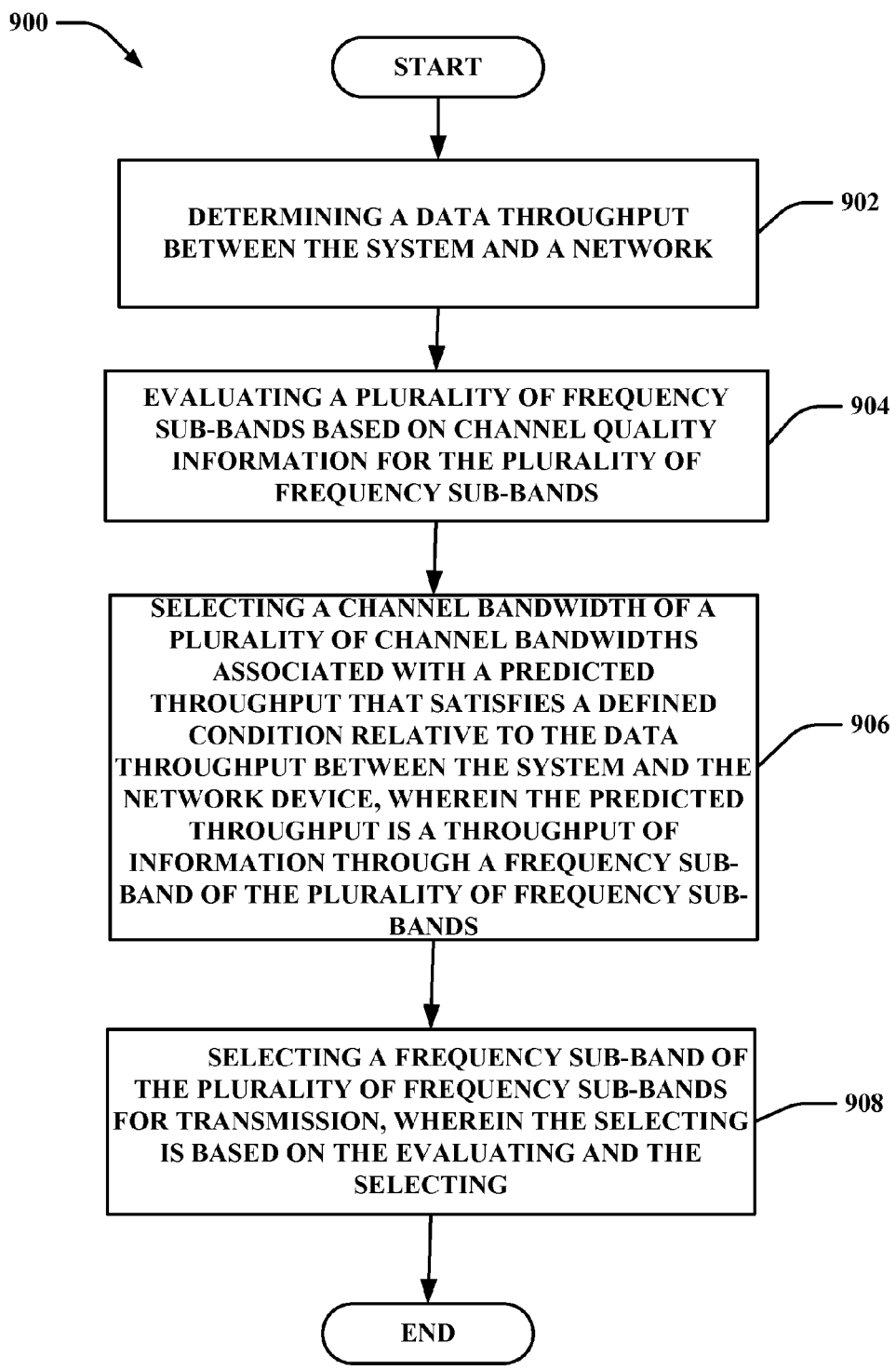

Turning now to FIG. 9, at 902, method 900 can include determining data throughput between the system and a network. In some embodiments, the data throughput can be the maximum between the system and the network.

At 904, method 900 can include evaluating a plurality of frequency sub-bands based on channel quality information for the plurality of frequency sub-bands. In some embodiments, the evaluation can include ranking the frequency sub-bands based on the respective downlink channel quality indicator information and the respective uplink noise information for the plurality of frequency sub-bands.

The channel quality information can include respective downlink channel quality indicator information and respective uplink noise information for the plurality of frequency sub-bands.

At 906, method 900 can include selecting a channel bandwidth of a plurality of channel bandwidths associated with a predicted throughput that satisfies a defined condition relative to the data throughput between the system and the network device, wherein the predicted throughput is a throughput of information through a frequency sub-band of the plurality of frequency sub-bands. In some embodiments, the selection of the channel bandwidth includes selecting a minimum one of the plurality of channel bandwidths having an associated predicted throughput that is greater than the maximum data throughput between the system and the network.

At 908, method 900 can include selecting a frequency sub-band of the plurality of frequency sub-bands for transmission, wherein the selecting is based on the evaluating and the selecting.

Figure 10:
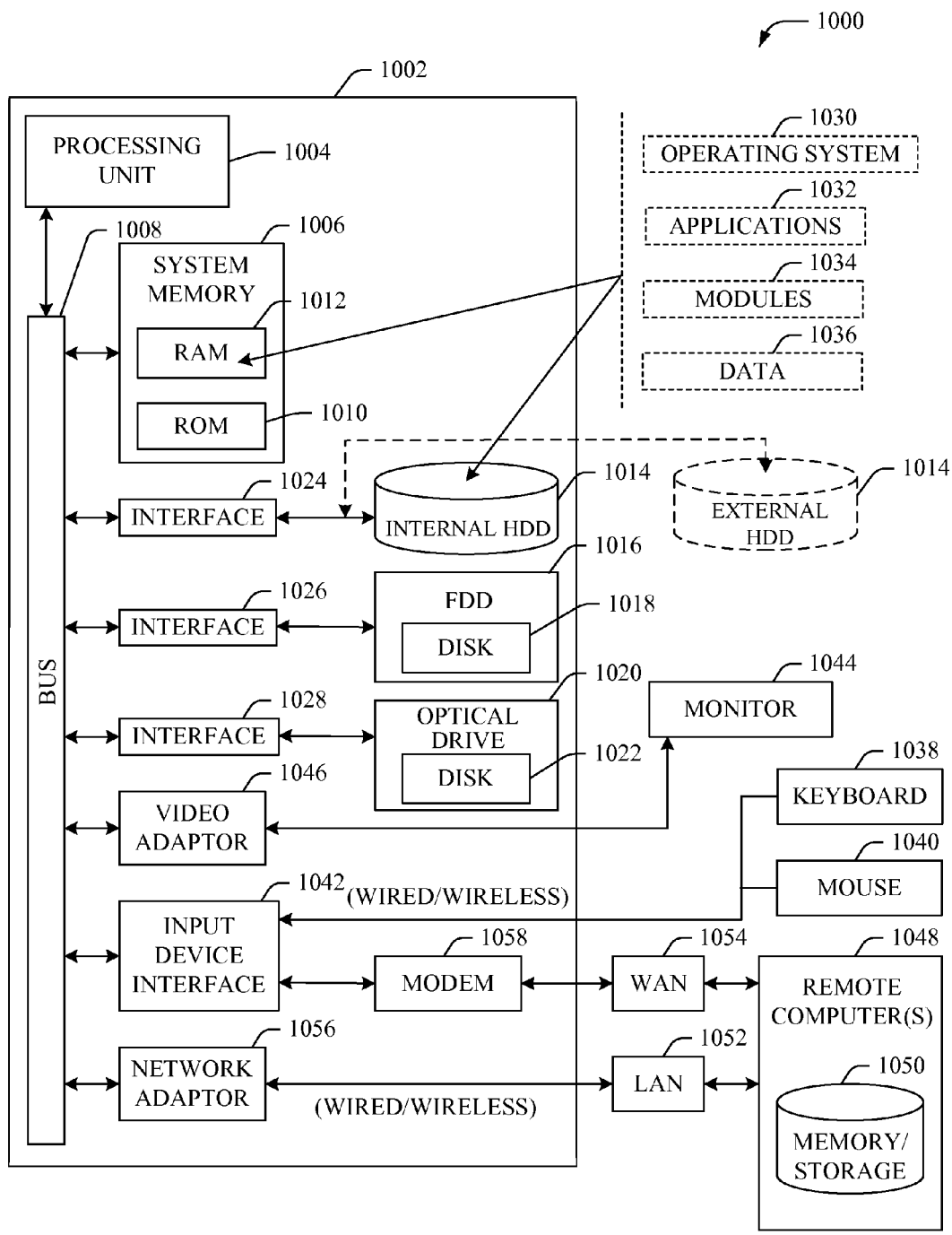
FIG. 10 illustrates a block diagram of a computer operable to facilitate processing for bandwidth-based femto cell management in accordance with embodiments described herein.

FIG. 10 illustrates a block diagram of a computer operable to facilitate processing for bandwidth-based femto cell management in accordance with embodiments described herein. For example, in some embodiments, the computer can be or be included within the FAPD 102, 200 and/or BBFM component 204, 300.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A mobile device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    determining, by an access point device including a processor, a data throughput associated with a broadband channel communicatively coupling the access point device and a network device of a network;
    evaluating, by the access point device, channel information associated with a plurality of frequency sub-bands, wherein the access point device is configurable to communicate over the plurality of frequency sub-bands; and
    selecting, by the access point device, a transmission parameter for a mobile device, wherein the selecting is based on the data throughput, and wherein the transmission parameter comprises information representing a selected one of the plurality of frequency sub-bands.

2. The method of claim 1, wherein the access point device is a femto cell access point device.

3. The method of claim 1, wherein the broadband channel is a digital subscriber line channel.

4. The method of claim 1, wherein the transmission parameter is included in a set of transmission parameters, wherein the set of transmission parameters comprises another parameter representing a channel bandwidth of the broadband channel.

5. The method of claim 1, wherein the evaluating the channel information comprises:
    evaluating downlink channel information associated with the plurality of frequency sub-bands;
    evaluating uplink noise information associated with the plurality of frequency sub-bands; and
    ranking the plurality of frequency sub-bands based on the evaluating the downlink channel information and the evaluating the uplink noise information for the plurality of frequency sub-bands.

6. The method of claim 5, wherein the downlink channel information comprises information indicative of a downlink channel quality of a channel accessible by the access point device.

7. The method of claim 1, wherein the determining the data throughput associated with the broadband channel between the access point device and the network device comprises:
    determining the data throughput associated with the broadband channel based on a time duration for transferring information from the access point device and the network device.

8. The method of claim 1, wherein the selecting the transmission parameter comprises:
    predicting a throughput for one of the plurality of frequency sub-bands, wherein the throughput corresponds to a first channel bandwidth of a plurality of channel bandwidths;
    determining whether the throughput satisfies a defined condition relative to the data throughput associated with the broadband channel; and
    in response to the throughput being determined to satisfy the defined condition, selecting the first channel bandwidth for the transmission parameter.

9. The method of claim 8, wherein the defined condition comprises a condition of the radio throughput being greater than the data throughput associated with the broadband channel.

10. The method of claim 1, wherein the selecting the transmission parameter comprises:
    selecting a minimum channel bandwidth of a plurality of channel bandwidths that corresponds to a predicted throughput that satisfies a defined condition relative to the data throughput associated with the broadband channel.

11. The method of claim 10, wherein the selecting the transmission parameter further comprises:
    determining a combined predicted throughput resultant from combining a plurality of predicted throughputs including the predicted throughput, wherein the determining the combined predicted throughput is performed after determining that the predicted throughput fails to satisfy the defined condition;
    comparing the combined predicted throughput to the data throughput associated with the broadband channel between the access point device and the network device; and
    selecting a second channel bandwidth for the transmission parameter based on the combined predicted throughput being determined to satisfy the defined condition, wherein the second channel bandwidth is defined to be wider than the first channel bandwidth.

12. The method of claim 11, wherein the plurality of channel bandwidths comprises a plurality of long-term evolution channel bandwidths.

13. A system, comprising:
    a memory to store instructions; and
    a processor, communicatively coupled to the memory, that facilitates execution of instructions to perform operations, comprising:
        determining a data throughput between the system and a network device;
        evaluating a plurality of frequency sub-bands based on channel quality information for the plurality of frequency sub-bands;
        selecting a channel bandwidth of a plurality of channel bandwidths associated with a predicted throughput that satisfies a defined condition relative to the data throughput between the system and the network device, wherein the predicted throughput is a throughput of information through a frequency sub-band of the plurality of frequency sub-bands; and
        selecting a frequency sub-band of the plurality of frequency sub-bands for transmission, wherein the selecting is based on the evaluating and the selecting.

14. The system of claim 13, wherein the channel quality information comprises respective downlink channel quality indicator information and respective uplink noise information for the plurality of frequency sub-bands.

15. The system of claim 14, wherein the evaluating the plurality of frequency sub-bands comprises:
    ranking the plurality of frequency sub-bands based on the respective downlink channel quality indicator information and the respective uplink noise information for the plurality of frequency sub-bands.

16. The system of claim 13, wherein the data throughput between the system and the network device comprises a defined digital subscriber line throughput between the system and the network device.

17. The system of claim 13, wherein the selecting the channel bandwidth of the plurality of channel bandwidths comprises:
    selecting the channel bandwidth of the plurality of channel bandwidths determined to have an associated predicted throughput that is greater than the data throughput between the system and the network device.

18. A non-transitory computer-readable medium storing computer-executable instructions that, in response to execution, cause a system including a processor to perform operations, comprising:
  ranking a plurality of frequency sub-bands based on channel quality information determined for the plurality of frequency sub-bands;
  selecting a channel bandwidth of a plurality of channel bandwidths associated with a predicted throughput that satisfies a defined condition relative to a data throughput, wherein the predicted throughput is a throughput of information through a frequency sub-band of the plurality of frequency sub-bands; and
  selecting a frequency sub-band of the plurality of frequency sub-bands, wherein the selecting the frequency sub-band is based on the ranking.

19. The non-transitory computer-readable medium of claim 18, wherein the channel quality information comprises:
  respective downlink channel quality indicator information and respective uplink noise information for the plurality of frequency sub-bands.

20. The non-transitory computer-readable medium of claim 18, wherein the operations further comprise:
  determining the data throughput from the system to a network device.

* * * * *